US006402323B1

(12) United States Patent
Shiue et al.

(10) Patent No.: US 6,402,323 B1
(45) Date of Patent: Jun. 11, 2002

(54) REFLECTIVE TYPE LIQUID CRYSTAL PROJECTION SYSTEM

(75) Inventors: Shin Gwo Shiue, Hsinchu Hsien; I-Pen Chien, Tao-Yuan Hsien; Mang Ou-Yang, Hsinchu; Chun-Lung Lai, Tao-Yuan Hsien; Hsin-Chu Liu, Hsin-Chu, all of (TW)

(73) Assignee: K Laser Technology, Inc., Hsinchu (TW)

( * ) Notice: Subject to any disclaimer, the term of this patent is extended or adjusted under 35 U.S.C. 154(b) by 0 days.

(21) Appl. No.: 09/653,317

(22) Filed: Sep. 1, 2000

(51) Int. Cl.[7] ............... G03B 21/14; G03B 21/00; G03B 21/26; G03B 21/28
(52) U.S. Cl. ............... 353/20; 353/33; 353/34; 353/37; 353/82; 349/9
(58) Field of Search ............... 353/20, 82, 31, 353/33, 34, 37; 349/8, 9

(56) References Cited

U.S. PATENT DOCUMENTS

| | | | | |
|---|---|---|---|---|
| 5,245,449 A | * | 9/1993 | Ooi et al. | 359/40 |
| 5,374,968 A | * | 12/1994 | Haven et al. | 353/31 |
| 6,113,239 A | * | 9/2000 | Sampsell et al. | 353/31 |
| 6,247,814 B1 | * | 6/2001 | Lin | 353/20 |
| 6,273,567 B1 | * | 8/2001 | Conner et al. | 353/20 |
| 6,280,037 B1 | * | 8/2001 | Smith | 353/31 |

* cited by examiner

Primary Examiner—Christopher Mahoney
Assistant Examiner—Magda Cruz
(74) Attorney, Agent, or Firm—Rosenberg, Klein & Lee

(57) ABSTRACT

The present invention proposes a reflective type liquid crystal projection system, which comprises an incident light source providing an S-polarization light beam or a P-polarization light beam as the incident light beam. A polarization of color-splitting device having a first polarization of color splitter and a second polarization of color splitter is used to split the incident light beam of three primary colors into two sets of light beams, which respectively penetrate through or are reflected. The two sets of light beams split by the first polarization of color splitter are reflected by two reflective mirrors, traverse two polarizing plates arranged between the reflective mirrors and the second polarization of color splitter, and are then incident on the second polarization of color splitter. At least a retarder is arranged between the reflective mirrors and the polarization of color-splitting device. The split light beams of three primary colors are assembled into an output light beam by a color-combining device comprising three PBS's. Finally, the output light beam is projected to form the image via a projection lens.

9 Claims, 3 Drawing Sheets

REFLECTIVE TYPE LIQUID CRYSTAL PROJECTION SYSTEM

FIELD OF THE INVENTION

The present invention relates to a liquid crystal projection system and, more particularly, to a projection system adopting reflective type of liquid crystal display.

BACKGROUND OF THE INVENTION

A prior art transmission-type liquid crystal projection system has the advantages of high image quality, compact size, and portability so that the commercially available reflective type liquid crystal projection system cannot compete with it in compactness, brightness, and price. The main reasons are that optical paths of primary colors between the reflective type liquid crystal display (LCD) panel and the projection lens are too long, and that the required birefringence, stress, and coating characteristics of the prism material are very stringent. Therefore, bad imaging quality will arise, and the brightness is not able to compete with that of a transmission-type liquid crystal projection system.

Accordingly, the present invention proposes a reflective type liquid crystal projection system aimed to resolve the above drawbacks so that the volume of the optical system can be reduced, and the distance of the incident polarized light beam to the reflective type LCD panel can be decreased. Thereby, the imaging quality of the system can be effectively enhanced, and the production cost can be decreased.

SUMMARY AND OBJECTS OF THE PRESENT INVENTION

The primary object of the present invention is to provide a reflective type liquid crystal projection system having short optical paths and high contrast.

Another object of the present invention is to provide a reflective type liquid crystal projection system, which can resolve the problems encountered in the prior art reflective type LCD technology so as to achieve the effects of good imaging quality, compact size, and low price.

Yet another object of the present invention is to reduce the difficulty of coating the dielectric thin film of the polarizing beam splitter (PBS) used in the reflective type liquid crystal projection system.

According to the present invention, a reflective type liquid crystal projection system comprises an incident light source. A polarization of color-splitting device having a first polarization of color splitter and a second polarization of color splitter is used to let the light beam of one primary color be reflected and the light beam of the other two primary colors penetrate through. The two sets of light beams split by the first polarization of color splitter are reflected by two reflective mirrors, traverse two polarizing plates and a retarder arranged between the reflective mirrors and the second polarization of color splitter, and are then incident on the second polarization of color splitter to penetrate through and be reflected, respectively. The split light beams of three primary colors are assembled into an output light beam by a color-combining device comprising three PBS's. Finally, the output light beam is projected to form the image via a projection lens.

The various objects and advantages of the present invention will be more readily understood from the following detailed description when read in conjunction with the appended drawings, in which:

DETAILED DESCRIPTION OF THE PREFERRED EMBODIMENT

The present invention is characterized in that two polarization of color splitters, two reflective mirrors, and three PBS's are used. Moreover, polarizing plates are arranged at the planes where light beam of each color enters and leaves the PBS's to realize the splitting and combining optical paths of a reflective type liquid crystal projection system and to complete the design of color splitting and combining.

The incident light source of the present invention is a linearly polarized, and parallel light beam. The incident light beam can be a perpendicular polarization (S-polarization) light beam or a parallel polarization (P-polarization) light beam. The following description illustrates the functions and characteristics of the present invention with an S-polarization parallel light beam as the incident light.

Figure 1:
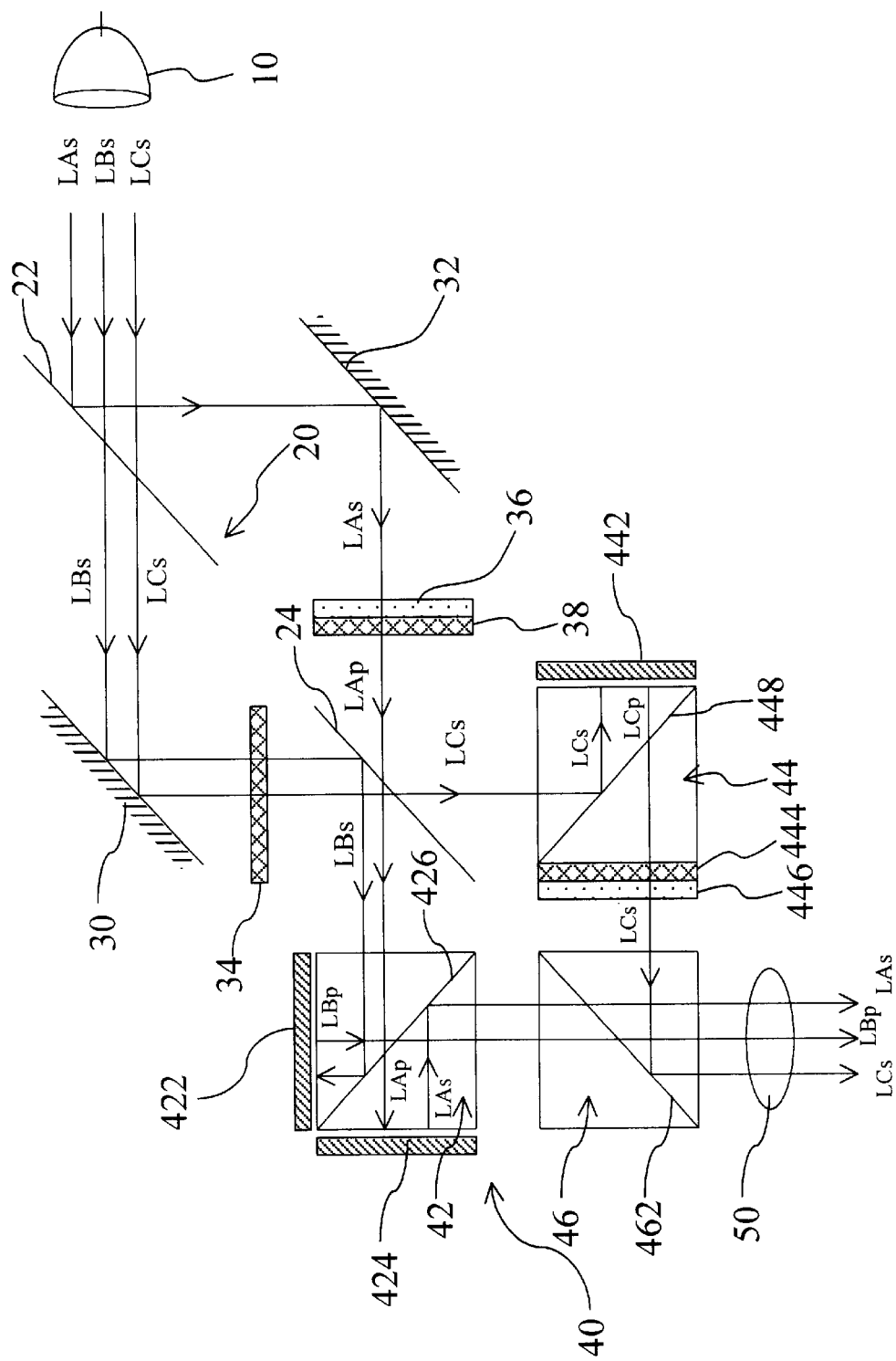
FIG. 1 is a schematic view according to an embodiment of the present invention.

As shown in FIG. 1, a reflective type liquid crystal projection system of the present invention comprises an incident light source 10, a polarization of color-splitting device 20, two reflective mirrors 30 and 32, a polarizing plate 34, a retarder 36, a polarizing plate 38, a color-combining device 40, and a projection lens 50. The light source 10 provides an S-polarization parallel light beam. The polarization of color-splitting device 20 is composed of a first polarization of color splitter 22 and a second polarization of color splitter 24. The color-combining device 40 is composed of a two-color first PBS 42, a single-color second PBS 44, and a single-color third PBS 46. The first polarization of color splitter 22 splits the S-polarization incident light beam into a light beam of one primary color and a light beam of the other two primary colors to be reflected and penetrate through, respectively. The two light beams are reflected to the second polarization of color splitter 24 by the reflective mirrors 30 and 32, respectively. The two light beams will respectively traverse the polarizing plate 34 arranged between the reflective mirror 30 and the second polarization of color splitter 24, and the retarder 36 and the polarizing plate 38 arranged between the reflective mirror 32 and the second polarization of color splitter 24 before they enter the second polarization of color splitter 24.

The two split light beams of three primary colors passing the second polarization of color splitter 24 will be split into two sets of light beams, which enter different PBS's of the color-combining device 40, respectively. Two reflective type LCD panels 422 and 424 are installed in the first PBS 42. A reflective type LCD panel 442 is installed in the second PBS 44. A polarizing plate 444 and a retarder 446 are installed at the projective plane of the second PBS 44. The first PBS 42 is used to reflect the light beam of the two primary colors to enter the third PBS 46. The second PBS 44 is used to reflect the light beam of the single primary color to enter the third PBS 46. Finally, the third PBS 46 is used to assemble the two light beams of three primary colors into an output light beam to be projected to form the image via the projection lens 50.

Each of the above three PBS's comprises a first prism and a second prism glued together and a dielectric thin film formed in between. The dielectric thin film is used to let light beam of primary colors penetrate or be reflected.

In addition to being arranged between the two reflective mirrors and the second polarization of color splitter, the above two polarizing plates can also be arranged between the two reflective mirrors and the first polarization of color splitter to achieve the same functions.

In the system shown in FIG. 1, the S-polarization light beam emitted by the light source 10 is first incident on the first polarization of color splitter 22 to be split into two sets of light beams. One light beam comprises the light of a single primary color of the three primary colors (red, blue, green; R, G, B), as the LAs shown in the figure. The other light beam comprises the other two primary colors, as the LBs and LCs shown in the figure. The LAs is reflected by the reflective mirror 32, transformed to a P-polarization light LAp by the retarder 36 and the polarizing plate 38, and purified. The LBs and LCs are reflected by the reflective mirror 30, and purified by the polarizing plate 34. The LBs, LCs, and LAp then pass the second polarization of color splitter 24 so that the LAp and LCs penetrate the second polarization of color splitter 24 while the LBs is reflected by the second polarization of color splitter 24 and combined with the LAp to form a single light beam. The combined light beam of the LBs and LAp is projected toward the first PBS 42, while the LCs is projected toward the second PBS 44.

When the LBs and LAp are projected into the first PBS 42, the LBs will be reflected to the reflective type LCD panel 422 by the dielectric thin film 426 and transformed into a P-polarization light beam LBp because of phase change of 90 degrees, and the LAp will penetrate through the dielectric thin film 426 to the reflective type LCD panel 424 and be reflected to become an S-polarization light beam LAs because of phase retard of 90 degrees. The characteristic of the dielectric thin film 426 will let the LBp penetrate and the LAs be reflected.

After the other light beam LCs is projected into the second PBS 44, it will be reflected by the dielectric thin film 448 to the reflective type LCD panel 442 and transformed into a P-polarization light beam LCp because of phase change of 90 degrees. The characteristic of the dielectric thin film 448 will let a P-polarization light beam penetrate and an S-polarization light beam be reflected. After the LCp is projected out from the second PBS 44, it is purified by the polarizing plate 444, and then transformed into an S-polarization light LCs by the phase retarder 446. The LCs and the LAs and LBp projected out from the first PBS 42 are projected into the third PBS 46 together. The characteristic of the dielectric thin film 462 will let the LBp and LAs penetrate and the LCs be reflected. Finally, the three light beams LAs, LBp, and LCs of three primary colors are combined to become an output light beam, which is projected to the projection lens 50 to form the image on the screen.

Figure 2:
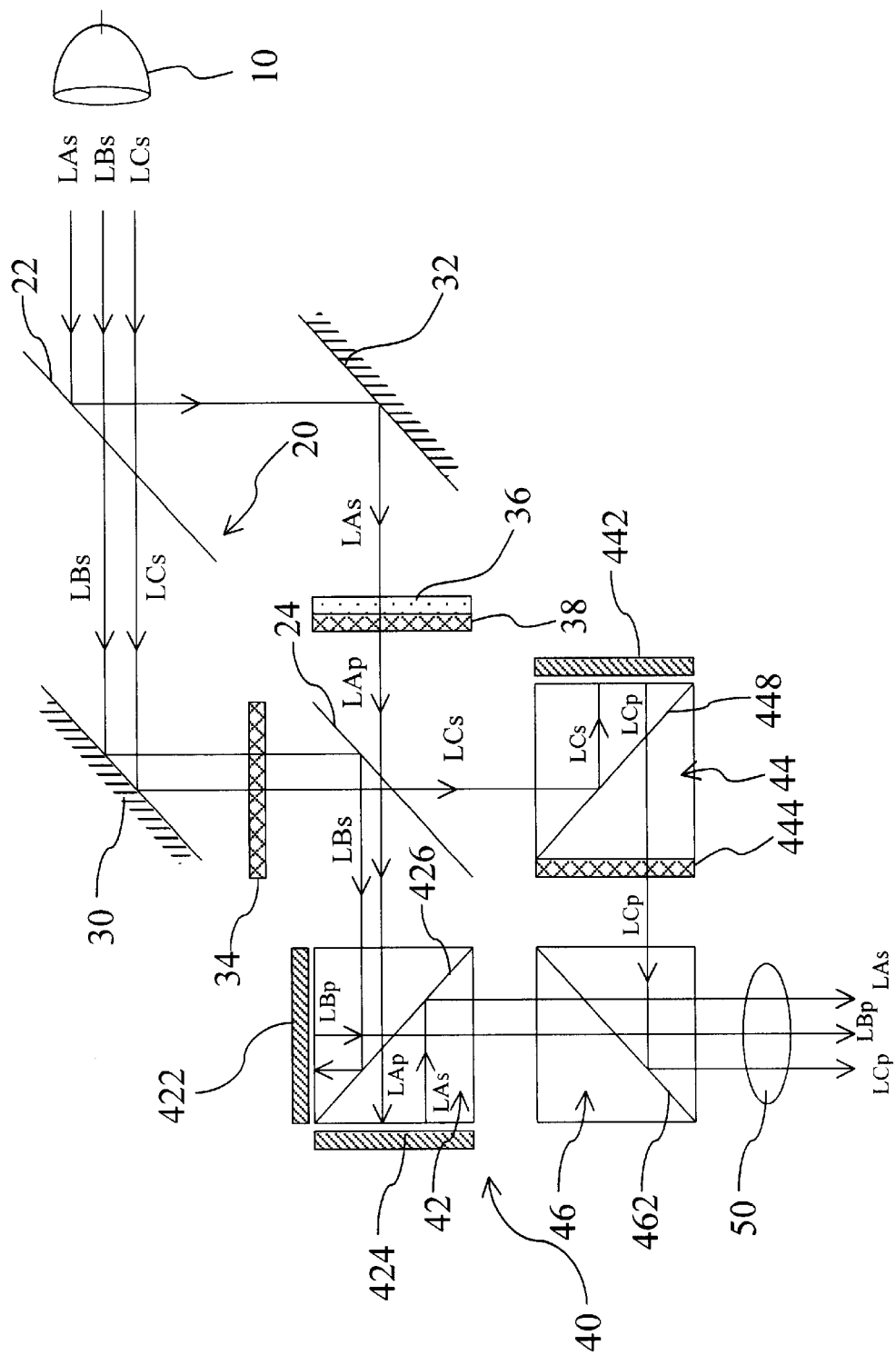
FIG. 2 is a schematic view according to another embodiment of the present invention.

As shown in FIG. 2, in another embodiment of the present invention, only a polarizing plate 444 is installed at the projective plane of the second PBS 44. There is no retarder over there. The P-polarization light beam LCp will directly traverse the polarizing plate 444 to be purified and then projected into the third PBS 46, and is reflected to the projection lens 50 by the dielectric thin film 462 in the form of LCp.

Figure 3:
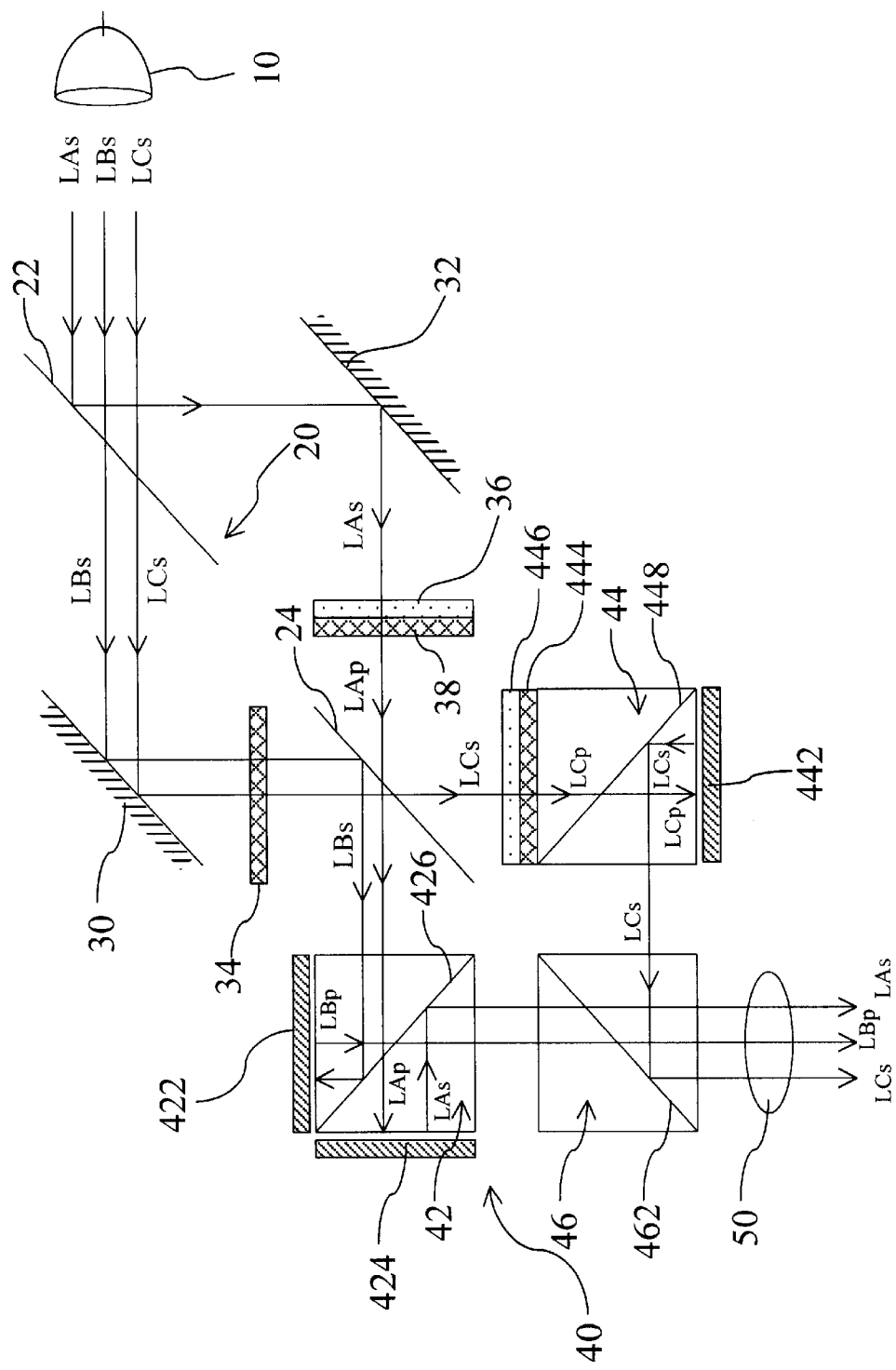
FIG. 3 is a schematic view according to yet another embodiment of the present invention.

As shown in FIG. 3, in yet another embodiment of the present invention, the polarizing plate 444 and the retarder 446 are disposed at the incidence plane of the second PBS 44 to directly transform the incident light beam LCs into the LCp. The LCp will then penetrate through the dielectric thin film 448 to the reflective type LCD panel 442 and become the LCs because of phase change of 90 degrees. Next, the LCs will be projected into the third PBS 46. Because the remaining parts are the same as those of FIG. 1, they will not be further illustrated.

The present invention uses two polarization of color splitters of a polarization of color-splitting device to split an incident light beam into a light beam of a single primary color and a light beam of the other two primary colors so that they respectively penetrate or are reflected. Polarizing plates and a phase retarder are also used to change the polarizing characteristic of the light beam of each primary color to reduce the difficulty encountered when light beams of three primary colors enter two sets of PBS's and dielectric thin films. Moreover, the present invention reduces the optical paths of incident light beams of primary colors to the PBS's so as to enhance the contrast of polarizing lights of the system. The present invention also decrease the required quantity of two-color PBS's so that coating difficulty can be reduced. This is because the design and fabrication of a two-color PBS is more difficult and expensive. Additionally, the present invention splits an incident light beam comprising three primary colors into two sets of light beams to enter different PBS's, respectively. Polarizing plates most efficient in each frequency band are used so that better contrast of brightness and coloration can be achieved.

Summing up, the reflective type liquid crystal projection system of the present invention has the advantages of short optical paths, high contrast, compact size, and low price so that the problem of the prior art reflective type LCD technology can be resolved.

Although the present invention has been described with reference to the preferred embodiments thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A reflective type liquid crystal projection system comprising:
   an incident light source for generating a parallel light beam, said parallel light beam having first, second and third primary color frequencies and being s-polarized;
   a first frequency dependent beam splitter reflecting said first primary color frequency light and transmitting said second and third primary color frequency light beams;
   a first mirror for directing said second and third primary color frequency light beams through an s-polarizing plate for polarization filtering;
   a second mirror for directing said first primary color frequency light through a first retarder plate and a p-polarizing plate, said first retarder plate converting said first primary color frequency light to p-polarized light, said p-polarizing plate filtering said p-polarized first primary color frequency light;
   a second frequency dependent beam splitter reflecting said second primary color frequency light and transmitting said first and third primary color frequency light beams, said first and second primary color frequency light beams being received by a two-color polarizing beam splitter, said two-color polarizing beam splitter converting said second primary color frequency light to p-polarization and said first primary color frequency light to s-polarization, said third primary color frequency light beam being received by a single-color polarizing beam splitter, said single-color polarizing beam splitter converting said s-polarized third primary color frequency light to p-polarization and transmitting said p-polarized third primary color frequency light through a p-polarization filter and then through a second retarder plate, converting said third primary color frequency light back to s-polarization, said third primary color frequency light beam being received by a single-color polarizing beam splitter, said single-color polarizing beam splitter converting said s-polarized third primary color frequency light to p-polarization and transmitting said p-polarized third primary color frequency light through a p-polarization filter and then through s-polarized first and third primary color frequency light beams being recombined with said p-polarized second primary color frequency light beam.

2. The reflective type liquid crystal projection system as recited in claim 1 wherein said polarizing plates are installed behind incident planes of said single color polarizing beam splitter and said two-color polarizing beam splitter, respectively.

3. The reflective type liquid crystal projection system as recited in claim 1 wherein said retarder plates are installed behind incident planes of said single-color polarizing beam splitter and said two-color polarizing beam splitter.

4. The reflective type liquid crystal projection system as recited in claim 1, wherein reflective type liquid crystal display panels are installed behind said two-color and single-color polarizing beam splitters, respectively.

5. The reflective type liquid crystal projection system as recited in claim 1, wherein each of said polarizing beam splitters comprises a first prism and a second prism adhered to one another with a dielectric thin film formed therebetween.

6. The reflective type liquid crystal projection system as recited in claim 1, wherein said polarizing plates are installed at an incident plane of said two-color polarizing beam splitter.

7. The reflective type liquid crystal projection system as recited in claim 1, wherein said first retarder is installed at an incident plane of said two-color polarizing beam splitter.

8. The reflective type liquid crystal projection system as recited in claim 1, wherein said polarizing plates are installed in front of incident planes of said single-color polarizing beam splitter and said two-color polarizing beam splitter, respectively.

9. The reflective type liquid crystal projection system as recited in claim 1, wherein said retarder plates are installed in front of incident planes of said single-color polarizing beam splitter and said two-color polarizing beam splitter, respectively.

* * * * *